United States Patent [19]

Harada et al.

[11] 4,451,887
[45] May 29, 1984

[54] SYSTEM FOR CONTROLLING A DOOR AND DRIVER'S SEAT OF VEHICLE

[75] Inventors: Kuniyoshi Harada, Takahama; Nobuyasu Suzumura; Naofumi Fujie, both of Tokyo, all of Japan

[73] Assignee: Aisin Seiki Kabushiki Kaisha, Kariya, Japan

[21] Appl. No.: 268,526

[22] Filed: May 29, 1981

[30] Foreign Application Priority Data

Jun. 13, 1980 [JP] Japan .................................. 55-79815

[51] Int. Cl.³ .......................... G06F 15/20; B60N 1/02
[52] U.S. Cl. ...................................... 364/424; 70/237; 296/65 R; 318/466; 364/425
[58] Field of Search .................. 364/424, 425; 70/237, 70/256, 261; 297/311; 296/64, 65 R, 146; 318/466, 467, 468

[56] References Cited

U.S. PATENT DOCUMENTS

| 3,243,216 | 3/1966 | Peters ................................. 318/466 |
| 3,597,554 | 8/1971 | Siegal ................................. 318/466 |
| 4,045,715 | 8/1977 | Umpleby et al. .................... 318/466 |
| 4,080,049 | 3/1978 | Oskam et al. ....................... 318/468 |
| 4,204,255 | 5/1980 | Cremer .............................. 364/425 |
| 4,306,124 | 12/1981 | Kondo et al. ....................... 318/467 |
| 4,338,553 | 7/1982 | Scott, Jr. ........................... 318/466 |

FOREIGN PATENT DOCUMENTS 1297 4/1979 European Pat. Off. .......... 296/65 R

Primary Examiner—Errol A. Krass
Attorney, Agent, or Firm—Sughrue, Mion, Zinn, Macpeak and Seas

[57] ABSTRACT

A system is provided for establishing and controlling the attitude of a driver's seat and providing a door lock-/unlock control of a vehicle. The vehicle carries an electronic control unit in which driver's identification codes and attitude data for establishing a driver's seat and mirrors are previously stored. A code signal is transmitted from a radio emitter, and is received by a radio receiver mounted on the vehicle. The control unit decodes the received code, and upon finding that it corresponds to one of the codes stored, unlocks the door of the vehicle and automatically establishes the attitude of the seat and the mirrors in accordance with data which is stored in correspondance to the code.

5 Claims, 23 Drawing Figures

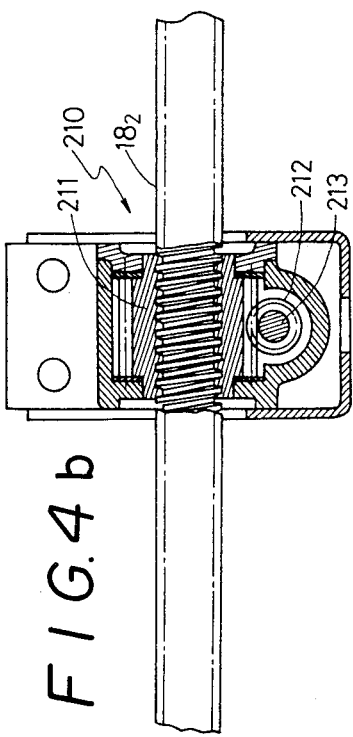
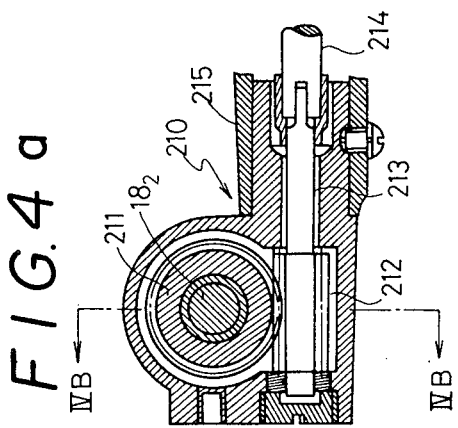
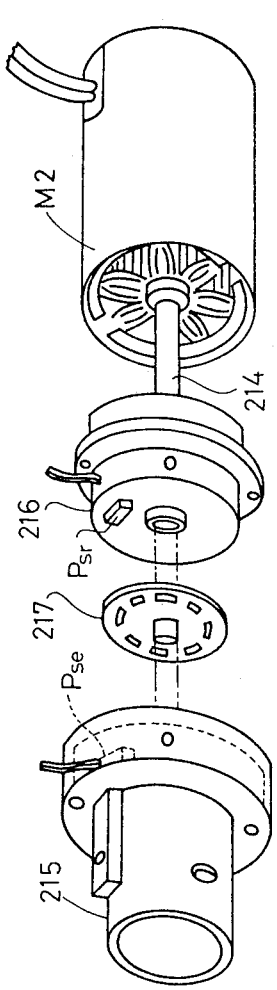
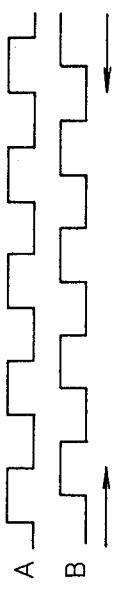
FIG.4b
FIG.4c
FIG.4d
FIG.4a

SYSTEM FOR CONTROLLING A DOOR AND DRIVER'S SEAT OF VEHICLE

BACKGROUND OF THE INVENTION

The invention relates to a system for controlling a door lock and the attitude of a driver's seat of a vehicle, in particular, to an electronic control system which controls a door lock and the attitude of a driver's seat in response to an electrically encoded instruction.

A door lock controlling technique is known for use in a vehicle, for example, in an automobile, in which a door associated with a driver's seat is provided with a lock-unlock switch in operative association with a door lock mechanism including a lock solenoid and an unlock solenoid, both of which may be controlled in response to an operation of the lock-unlock switch. Another control technique includes a vehicle speed detector mounted on the vehicle which activates a door lock solenoid in response to a vehicle speed which exceeds a given value. According to these techniques, every door is locked as a driver leaves his vehicle while a key is inserted into the keyhole of the door to unlock it whenever he desires to get into the vehicle.

On the other hand, it is necessary for a driver who drives a vehicle to manoeuvre a variety of devices including a steering wheel, an accelerator or brake pedal, a transmission and other switches in accordance with the traffic condition, the weather and road marks. It will be noted that these devices have their access ends fixed in position. By contrast, the physical features of drivers vary from driver to driver. Accordingly a driver's seat is adjusted to permit an adjustment of a forward/rearward position, a vertical position or elevation, an inclination and the degree of cushioning to the preference of each driver. It will be understood that a single car may be utilized by a plurality of persons. In addition, even a single driver may want to adjust the seat in a different manner in accordance with the degree of fatigue of the driver or road conditions such as the down or up grade or curves. However, a manual adjustment is cumbersome to operate as is the need for adjustment each time the driver gets on the vehicle.

The prior practice thus can be summarized as including the steps of inserting a key into the keyhole and turning it to open the door, and when he sits on the seat, manually adjusting the attitude of the seat before he drives the vehicle, and when he stops the vehicle, locking the rear doors before he gets out of the vehicle to close the driver's door. Alternatively, after the driver has got out of the vehicle, he closes the door and then inserts the key into the keyhole and turns it to lock the door. Thus it is apparent that a driver is required to perform a number of mechanical operations. In particular, when a single vehicle is shared by several drivers, an adjustment of the attitude of the driver's seat is required for each of them.

SUMMARY OF THE INVENTION

It is a first object of the invention to provide a system for controlling a door lock and a driver's seat which eliminates the need of a manual operation of mechanical parts for unlocking the door and for establishing the attitude of the driver's seat. It is a second object to provide a control system of the type described in which the door of the vehicle can be simply unlocked by a switch operation and in which the attitude of the driver's seat can also be simply adjusted to the preference of a driver through a switch operation. It is a third object to provide a control system capable of locking the door through a single switch operation; and it is a fourth object to provide a control system in which the door is unlocked in response to a switch input of a code designated for each driver, followed by the automatic establishment of the attitude of the driver's seat to suit the particular driver.

Above and other objects of the invention are achieved by a system for controlling a door lock and a driver's seat according to the invention which includes an automatic seat adjusting apparatus, a door lock controller, a signal receiver and an electronic control unit, all of which are mounted on a vehicle, in combination with a portable signal emitter.

The electronic control unit comprises an electronic processor such as a microcomputer including a read-write memory and a read only memory and having a high level logical processing capability. The operational program of the electronic processor includes the entry of an unlock code and the entry of information corresponding to a driver code, the decoding of an input code and the control of unlocking the door in the event the input code coincides with the stored unlock code, and the control of the attitude of a driver's seat in the event the input code coincides with a driver code. To simplify a door lock operation, it is preferred that the operational program includes the lock activation in response to a specific or arbitrary code.

The signal emitter preferably comprises a code or word generator including a plurality of switches. The code or word generator may be arranged to produce a code indicative of the closure of one of the switches. Alternatively, the code or word generator may be arranged such that it sequentially stores codes representing the individual switches closed until the number of switches closed reaches a given value, whereupon it produces a stored code. To provide a reduced size of the overall emitter, it is constructed as a portable unit, preferably in the form of a key. In one embodiment, the signal emitter comprises a radio transmitter which modulates a carrier with a code for electromagnetic transmission. In another embodiment, the emitter may deliver a bi-value signal representing the code or a carrier modulated with the code to electrical connection terminals. In this embodiment, the signal receiver on the vehicle is provided with a female or male connector for connection with the corresponding connector formed on the emitter so that the signal can be transferred to the receiver upon mechanical engagement therebetween.

The signal receiver can be constructed in a manner corresponding to the construction of the signal emitter. If the signal emitter is arranged as a radio transmitter, the receiver may comprise a receiving coil and a demodulator, with the coil being located to facilitate the interception of the electromagnetic wave transmitted by the radio transmitter.

The electronic control unit or the signal emitter is provided with a character display for displaying input data or stored data. In one preferred embodiment, the electronic control unit is provided with key switches and a character display so that the operation of a selected key switch commands the storage of a door unlock code and attitude information, and information in the form of numerals, alphabets or the like which are indicated by the code corresponding to the key input can be displayed on the character display. The signal emitter may be provided with indicator lamps for indicating key inputs as well as the character display. Alternatively, an arrangement may be made such that a switch operation in the signal emitter controls the storage of a door unlock code or of attitude information within the electronic control unit.

In a most preferred embodiment of the invention, a driver's code which is associated with attitude information is chosen to be identical with a door unlock code, and the electronic control unit unlocks the door in response to an oncoming unlock code which is equal to that stored, and establishes an attitude of the driver's seat in accordance with attitude information which is stored in correspondence to the unlock code.

Other objects and features of the invention will become apparent from the following description given with reference to the drawings.

BRIEF DESCRIPTION OF THE DRAWINGS

FIG. 4a is a section of a nut unit shown in FIG. 3 taken in a direction perpendicular to a threaded bolt;

FIG. 4b is a cross section taken along the line IVB—IVB shown in FIG. 4a;

FIG. 4c is an enlarged perspective view of a coupling between a motor and the nut unit;

FIG. 4d shows output signals from a phototransistor unit shown in FIG. 4c;

FIG. 8b is a block diagram illustrating the electrical components used in the signal emitter shown in FIG. 8a;

FIGS. 12a, 12b, 12c, 12d, 12e, 12f and 12g are flow charts illustrating the operation of a microcomputer disposed in the keyboard.

DESCRIPTION OF PREFERRED EMBODIMENT

Figure 1:
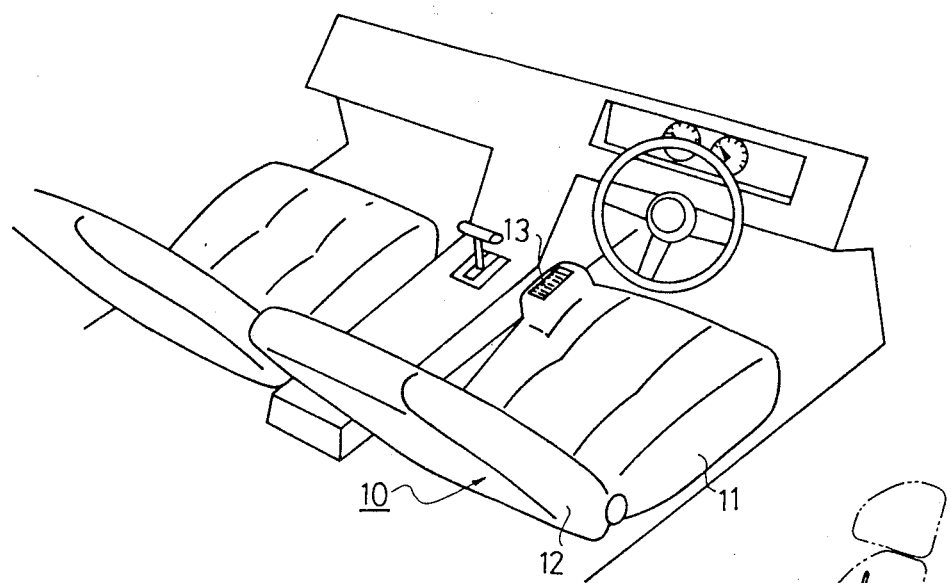
FIG. 1 is a perspective view illustrating the appearance of a driver's seat according to one embodiment of the invention.
Figure 2:
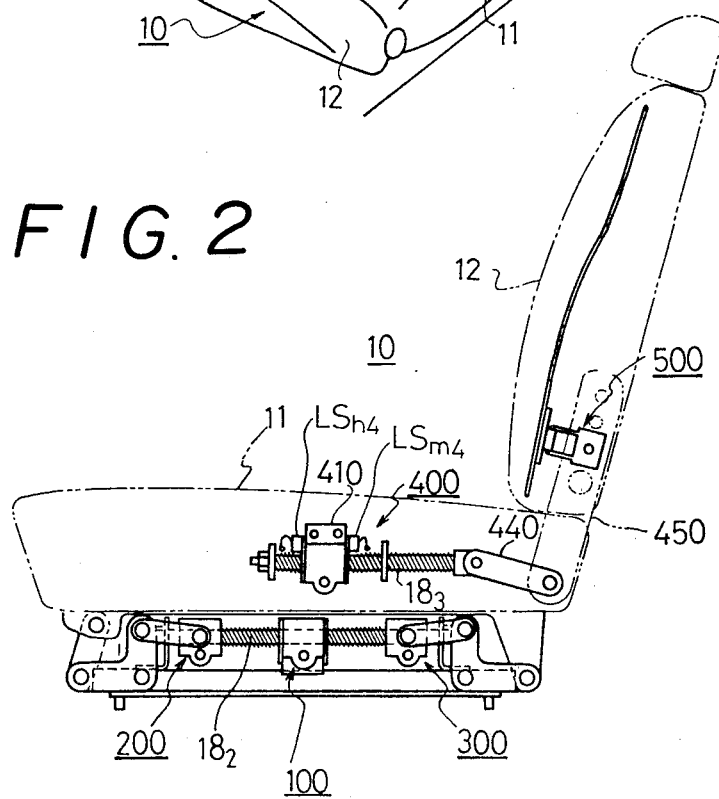
FIG. 2 is a side elevation of essential parts of an attitude control mechanism which is mounted on the seat shown in FIG. 1.

Referring to FIG. 1 which shows the appearance of driver's seat of one embodiment of the invention in perspective view, a driver's seat 10 is formed by a seat body 11 and a seat back 12 which is angularly movable with respect thereto. An operating board 13 is fixedly mounted on the seat body 11. An attitude controlling mechanism which is mounted on the seat body 11 and the seat back 12 is schematically illustrated in FIG. 2. In the example shown, the attitude controlling mechanism includes a seat forward/reverse drive mechanism 100 which causes a seat base supporting the seat body 11 to slide in the forward or reverse direction with respect to a base frame which is fixedly mounted on the floor of a vehicle, a seat front elevation adjusting mechanism 200 which elevates or lowers the front of the seat base, a seat rear elevation adjusting mechanism 300, a seat back tilting mechanism 400 pivotally mounted on the seat base for adjusting the angle of inclination of the seat back with respect to the frame, and a seat back cushion adjusting mechanism 500 which adjusts the spring cushion contained in the seat back. The combination of the seat front and the seat rear elevation adjusting mechanism 200, 300 determines the inclination of the seat body 11, and thus defines a seat base tilting mechanism.

Figure 3:
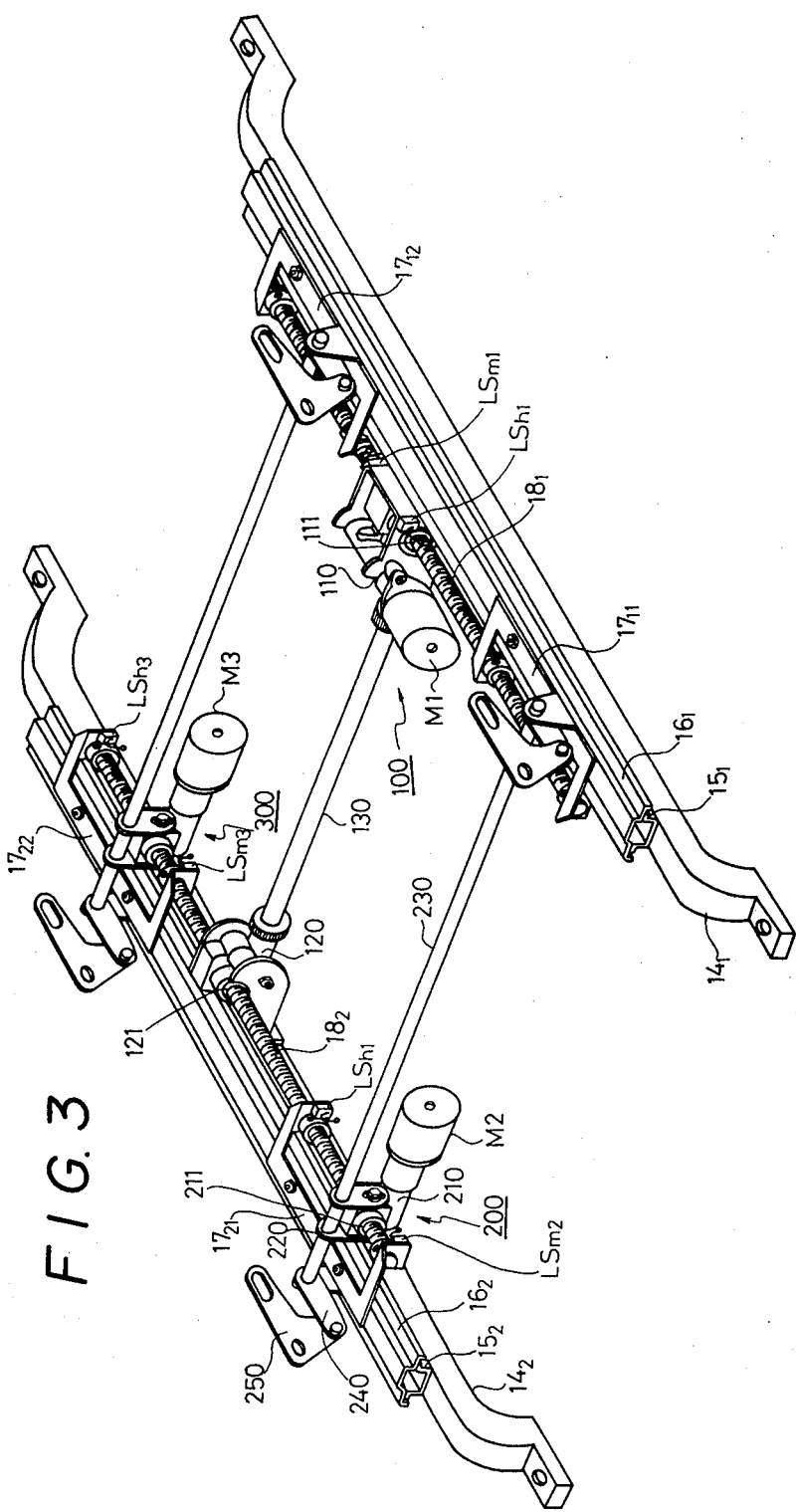
FIG. 3 is a perspective view showing the detail of a mechanism located below the base of the driver's seat shown in FIG. 1.

The mechanism located below the seat base which supports the seat body 11 is shown in FIG. 3. In this Figure, a pair of base frames $14_1$, $14_2$ are secured to the floor of the vehicle, and a pair of lower rails $15_1$, $15_2$ are fixedly mounted thereon. A pair of upper rails $16_1$, $16_2$ slidably rest on the lower rails $15_1$, $15_2$, respectively. A pair of arms $17_{11}$, $17_{12}$ are fixedly mounted on the upper rail $16_1$ while a pair of arms $17_{21}$, $17_{22}$ are fixedly mounted on the upper rail $16_2$. The arms $17_{11}$, $17_{12}$ fixedly carry a threaded bolt $18_1$ while the arms $17_{21}$, $17_{22}$ fixedly carry another threaded bolt $18_2$.

The threaded bolts $18_1$, $18_2$ threadably engage nut units 110, 120, respectively, which are fixedly mounted on the base frames $14_1$, $14_2$, respectively. The both nut units 110, 120 constitute together the seat forward-/reverse drive mechanism 100, and includes a pair of nuts 111, 121 each having a threaded bore formed therein which is engaged by an associated one of the threaded bolts $18_1$, $18_2$, and having teeth formed around its outer periphery, and worm gears meshing with the nuts 111, 121, respectively. These worm gears are coupled together by a flexible shaft 130. In the unit 110, a bevel gear is fixedly mounted on the shaft on which the worm gear is mounted and meshes with another bevel gear which is fixedly mounted on the shaft of a motor M1. Since these units 110, 120 are secured to the respective base frames $14_1$, $14_2$, it will be seen that when the motor M1 is energized for rotation, the inner shaft of the flexible shaft 130 rotates to cause a rotation of the worm gear, thus rotating the meshing nuts 111, 121 which in turn forward the threaded bolts $18_1$, $18_2$, respectively. Since the threaded bolts $18_1$, $18_2$ are secured to the upper rails $16_1$, $16_2$ through the arms $17_{11}$, $17_{12}$, $17_{21}$ and $17_{22}$, a movement of the upper rails $16_1$, $16_2$ occurs. In this manner, the rotation of the motor $M_1$ in the forward or reverse direction causes a sliding movement of the upper rails $16_1$, $16_2$ either forwardly or reversely with respect to the lower rails $15_1$, $15_2$.

The seat front elevation adjusting mechanism 200 includes a nut unit 210 constructed in the same manner as the unit 120, a motor M2, a rocking arm 220, a rod 230 integrally secured to the arm 220, a link arm 240 integrally secured to the rod 230, and a base arm 250 pivotally connected with the link arm 240 and to which the seat base (not shown) is fixedly connected. A rotation of the motor M2 in the forward or reverse direction causes the nut unit 210 to move either forwardly or reversely along the threaded bolt 18₂, thereby turning the rod 230 and the link arm 240 clockwise and counter-clockwise, respectively, to thereby move the base arm 250 in the vertical direction.

FIG. 4a is an enlarged cross section of the nut unit 210 through a plane including the rod 230 while FIG. 4b shows a section thereof taken along the line IV-B—IVB. In these Figures, the nut is shown at 211 which meshes with a worm 212 mounted on a worm shaft 213 which is coupled with a motor shaft 214. FIG. 4c shows, in exploded perspective view, the coupling between the motor M2 and the nut unit 210. The motor M2 includes an end plate 216 on which a phototransistor unit $P_{sr}$, representing a photocoupler, is fixedly mounted. A rotary slitted disc 217 is fixedly mounted on the motor shaft 214, and a light emitting unit $P_{se}$ of the photocoupler is fixedly mounted on a fixing sleeve 215 in opposing relationship with the phototransistor unit $P_{sr}$ with the slitted disc 217 interposed therebetween. Consequently, when the motor M2 is fixedly mounted on the nut unit 210 as shown in FIG. 3, signals A and B of waveforms as shown in FIG. 4d are developed by the phototransistor unit $P_{sr}$ as the motor M2 rotates in the forward or reverse direction. These signals A, B are used to detect the direction of rotation of the motor M2 and to detect the attitude and the position, as will be further described later. It is to be understood that each of the motors M1, M2 described above as well as motors M3 to M5 to be described later is associated with a slitted disc and a sensor unit $P_{se}$, $P_{sr}$ to produce a pair of signals A, B from each motor unit.

The seat rear elevation adjusting mechanism 300 is constructed, in quite the same manner as the mechanism 200, and therefore will not be described in detail.

The seat back tilting mechanism 400 is generally similar to the seat forward/reverse drive mechanism and includes a nut unit and a motor M4. Referring to FIG. 2 for describing it, it includes a nut unit 410 which is secured to the seat base (not shown, but is fixedly mounted on a member 250). A threaded bolt 18₃ threadably engages the nut unit 410, and has its one end pivotally connected to one end of a link arm 440, the other end of which is pivotally connected to a seat back arm 450 which is in turn fixedly mounted on the seat back frame. As the motor M4 rotates either forwardly or reversely, the seat back 12 is turned either clockwise or counter-clockwise.

Figure 5:
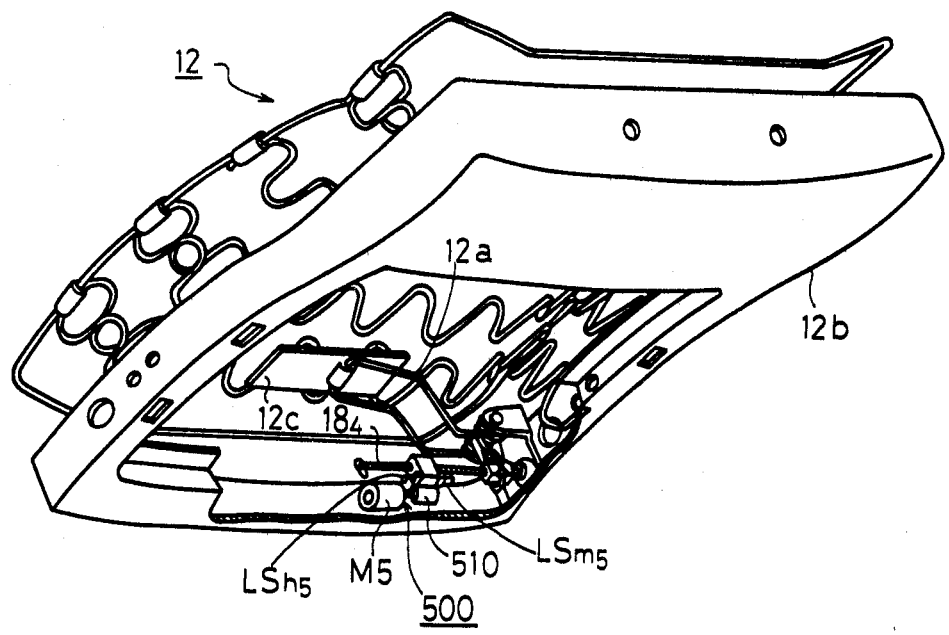
FIG. 5 is an exploded perspective view of the seat back shown in FIG. 1.

Referring to FIG. 5, the seat back 12 includes a torsion spring 12a, the resilience of which is adjusted by the seat back cushion control mechanism 500. Specifically, a nut unit 510 is fixedly mounted on the seat back frame 12b, and is threadably engaged by a threaded bolt 18₄, one end of which is coupled to one end of the torsion spring 12a. By rotating the motor M5 either forwardly or reversely, the threaded bolt translates to the left or right, whereby a lumber plated 12c coupled to the other end of the torsion spring 12a advances or retracts.

The five mechanisms which are used to establish a desired attitude include limit switches $LS_{h1}$–$LS_{h5}$ and $LS_{m1}$–$LS_{m5}$ which are located at the standby (or home) position and the maximum travel (limit position) and which are closed as a movable member moves close thereto.

It is to be noted that the driver's seat mechanism mentioned above remains the same as that disclosed in a pending U.S. Patent application Ser. No. 235,173, filed Feb. 17, 1981 and entitled "Attitude Control System for Driver's Seat".

Figure 6:
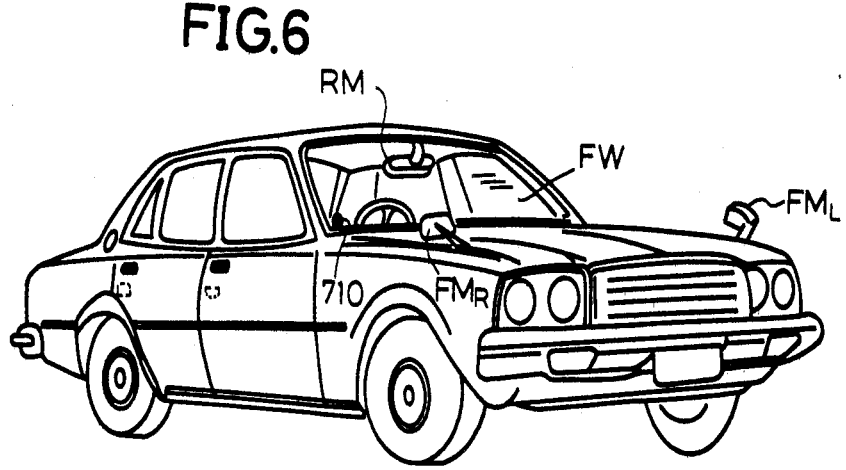
FIG. 6 is a perspective view illustrating the appearance of a vehicle on which the control system of the present embodiment is mounted.

FIG. 6 shows a perspective view illustrating the appearance of the vehicle. In the present embodiment, both a room mirror RM and fender mirrors $FM_R$, $FM_L$ are angularly adjustable in an automatic manner.

Figure 7:
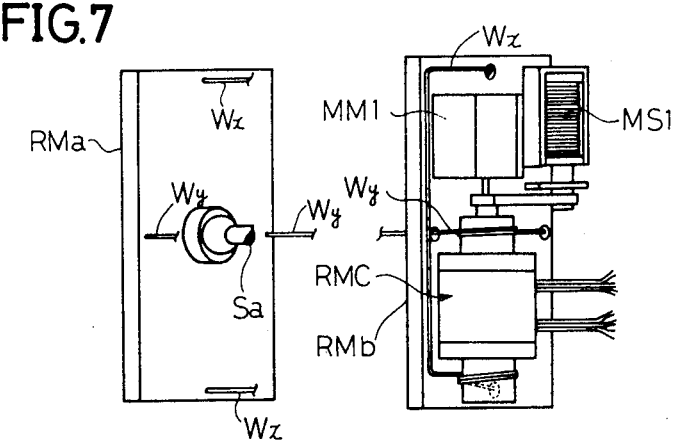
FIG. 7 is an exploded perspective view illustrating the essential construction of mirrors mounted on the vehicle shown in FIG. 6.

FIG. 7 is an exploded perspective view of the internal mechanism of the room mirror RM. It includes a mirror support RMa, an x-axis and a y-axis drive wire Wx, Wy so as to permit a rotation of the support about the major and the minor axis thereof. The rear surface of the support RMa, that is, the opposite side from the mirror carrying surface, is integrally formed with a rotary ball bearing having a spherical depression formed therein, which receives part of a spherical head of a support arm Sa. The support arm Sa has a limb which is fixedly connected to a base member RMb. A motor MM1, a clutch RMc, a solenoid MS1 and a wire guide pulley (not shown) are mounted on the base member RMb, with the wire Wy being disposed around the Y-axis rotary shaft and the wire Wx disposed around the x-axis rotary shaft of the clutch RMc. When the solenoid MS1 is deenergized, the clutch RMc couples the rotary shaft of the motor MM1 with the x-axis rotary shaft while when the solenoid MS1 is energized, the rotary shaft of the motor MM1 is coupled to the y-axis rotary shaft. The clutch RMc includes a stationary barrel which houses a potentiometer PT1x coupled to the x-axis rotary shaft and another potentiometer PT1y coupled to the y-axis rotary shaft. Consequently, the angular position of the mirror RM can be expressed in terms of outputs from these potentiometers PT1x, PT1y. The construction of the fender mirrors $FM_R$, $FM_L$ is entirely the same as that of the room mirror RM, and these fender mirrors include solenoids MS2, MS3 and potentiometers PT2x, PT2y and PT3x, PT3y.

Figure 8A:
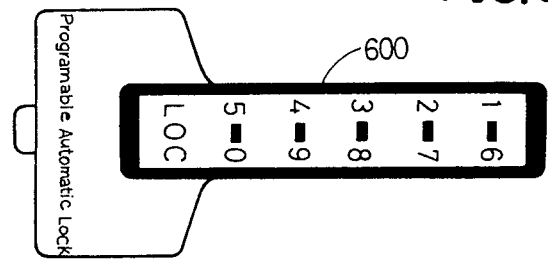
FIG. 8a is a plan view of a signal emitter of the embodiment.
Figure 8B:
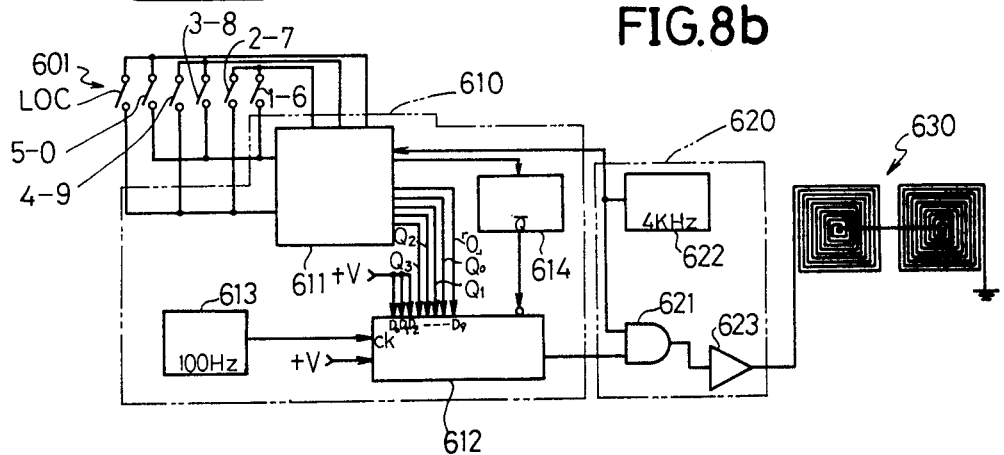

FIG. 8a illustrates the appearance of a signal emitter 600. The emitter 600 includes a front panel, the surface of which is printed with six spiral electrodes which are disposed in longitudinal alignment, with an electrically conductive, resilient film which exhibits a high resistance placed thereon. The peripheral edge of the film is joined to the front panel. In regions which are located directly above the spiral electrodes, the resilient film is printed with designations "1-6", "2-7", "3-8", "4-9", "5-0" and "LOC", with the hyphens or the letter "O" directly in alignment with the printed electrodes. The spiral electrodes in six discrete zones and the resilient film constitute together six key switches 601. A printed circuit board which has a code generator 610, a modulator and a transmitting coil 630 formed thereon is disposed below the front panel. The transmitting coil 630 is formed of printed electrodes. The combination of these elements and key switches 601 is shown in FIG. 8b. The code generator 610 comprises a keyboard encoder 611 having connections with the key contacts, an 8-bit shift register 612, a low frequency clock pulse oscillator y13 and a monostable multivibrator 614. When one of the key contacts is closed, the keyboard encoder 611 produces a 4-bit code representing such key contact, and supplies it to four of eight bit-parallel input terminals of the shift register 612 and also triggers the monostable multivibrator 614. The multivibrator 614 produces a low level or "0" output for a given time duration $T_{M1}$ once it is triggerred. During such time interval, the signals applied to the eight bit input terminals are stored in the shift register 612. When the output of the monostable multivibrator 614 returns to its high level or "1", the right bits are serially outputted at the serial output terminal of the shift register 612 with a period of an output pulse from the clock pulse oscillator 613. The output is in the form of "10XXXX111 . . . ", with the four "X" bits representing a code corresponding to the key which has been operated. The output from the shift register 612 is passed through an AND gate 621 of the modulator 620 where it provides an amplitude modulation of an output carrier from a carrier oscillator 622. The modulated carrier is amplified by an amplifier 623 to a level suitable for transmission and then applied to the coil 630. As a result, an alternating magnetic field is produced in an on-off manner in accordance with the code and transmitted in a direction perpendicular to the plane of the coil 630.

A receiver terminal 710 which is used to detect the alternating magnetic field is joined to the front window FW of the vehicle (see FIG. 6). An enlarged cross section of the receiver terminal 710 is shown in FIG. 11b. It will be seen that the receiver terminal 710 essentially comprises a ferrite core 711 and a coil 712 disposed thereon. The coil 712 is connected to a receiver 720. In the embodiment shown, the combination of the receiver terminal 710 and the receiver 720 constitute together a receiver unit. When a key is operated after the emitter 600 is brought close to the receiver terminal 710 on the front window FW, a change in the magnetic field produced by the coil 630 is detected by the coil 712, and is amplified by an amplifier 721 in the receiver 720, whereby 4 kHz signal is derived through a filter 722. Thus, a signal analogous to the output from the code generator 610 is produced at the output terminal of the filter 722. The output from the filter 722 is amplified by an amplifier 724 and then demodulated by a demodulator 724 into a form which is analogous to the output from the shift register 612 for application to an NAND gate 725. An output from the demodulator 724 is amplified before it is applied to a comparator 726 where it is compared against a given voltage $V_{ref}$. If the output exceeds the given level, the output of the comparator 726 changes to its high level or "1" while if it is below the given level, the output remains "0". If the output from the demodulator 724 is at its high level or "1" when the output of the comparator is "1", the NAND gate produces a "0" output, whereby the demodulated code is outputted.

Figure 9:
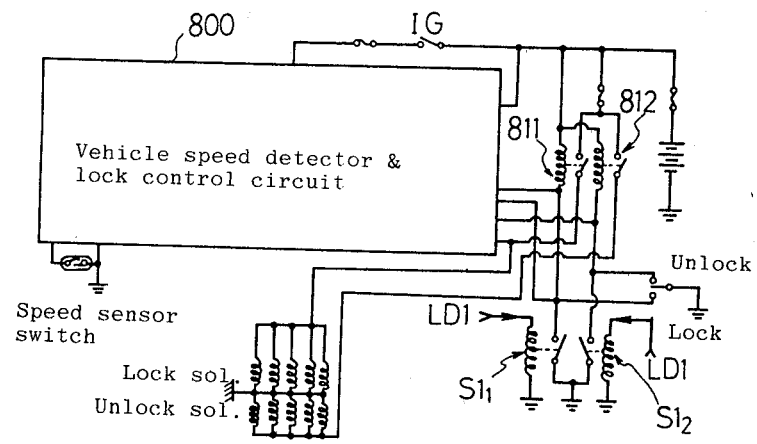
FIG. 9 is a circuit diagram of a door lock control circuit shown in FIG. 6.

FIG. 9 shows a door lock control circuit associated with the doors on the vehicle. In the door lock control circuit shown, lock and unlock relays $S1_1$ and $S1_2$ are added in order to carry out the invention. The remainder is originally provided in the prior arrangement where numeral 800 represents a circuit which controls a lock operation in response to the detection of a vehicle speed while numerals 811 and 812 represent lock and unlock relays, respectively.

Figure 10:
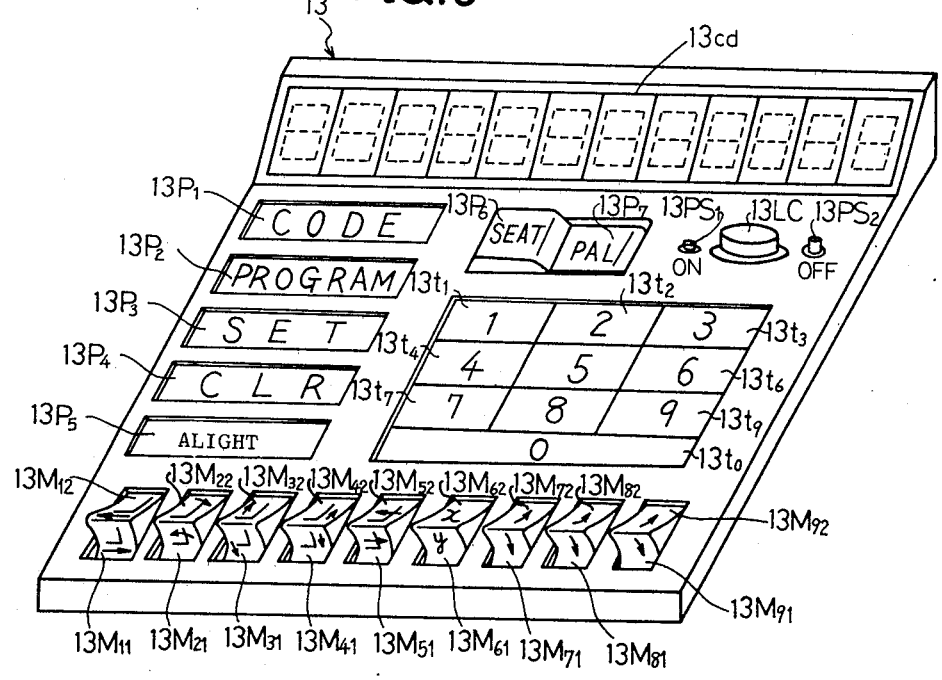
FIG. 10 is a perspective view illustrating the appearance of a keyboard mounted on the vehicle shown in FIG. 6 and forming part of the embodiment.

FIG. 10 is an enlarged perspective view of control panel 13. It will be noted that the control panel 13 is provided with a 12 digit 7-segment display 13cd, operation specifying keys $13P_1$–$13P_7$, adjusting switches $13M_{11}$–$13M_{92}$, ten keys $13t_0$–$13t_9$ and keyboard power switches $13PS_1$, $13PS_2$. Light emitting diodes $LD_1$–$LD_{13}$ are mounted inside the key buttons of the operation specifying keys $13P_1$–$13P_7$, a power-on indicator cover 13LC and the ten keys $13t_1$–$13t_5$.

Figure 11A:
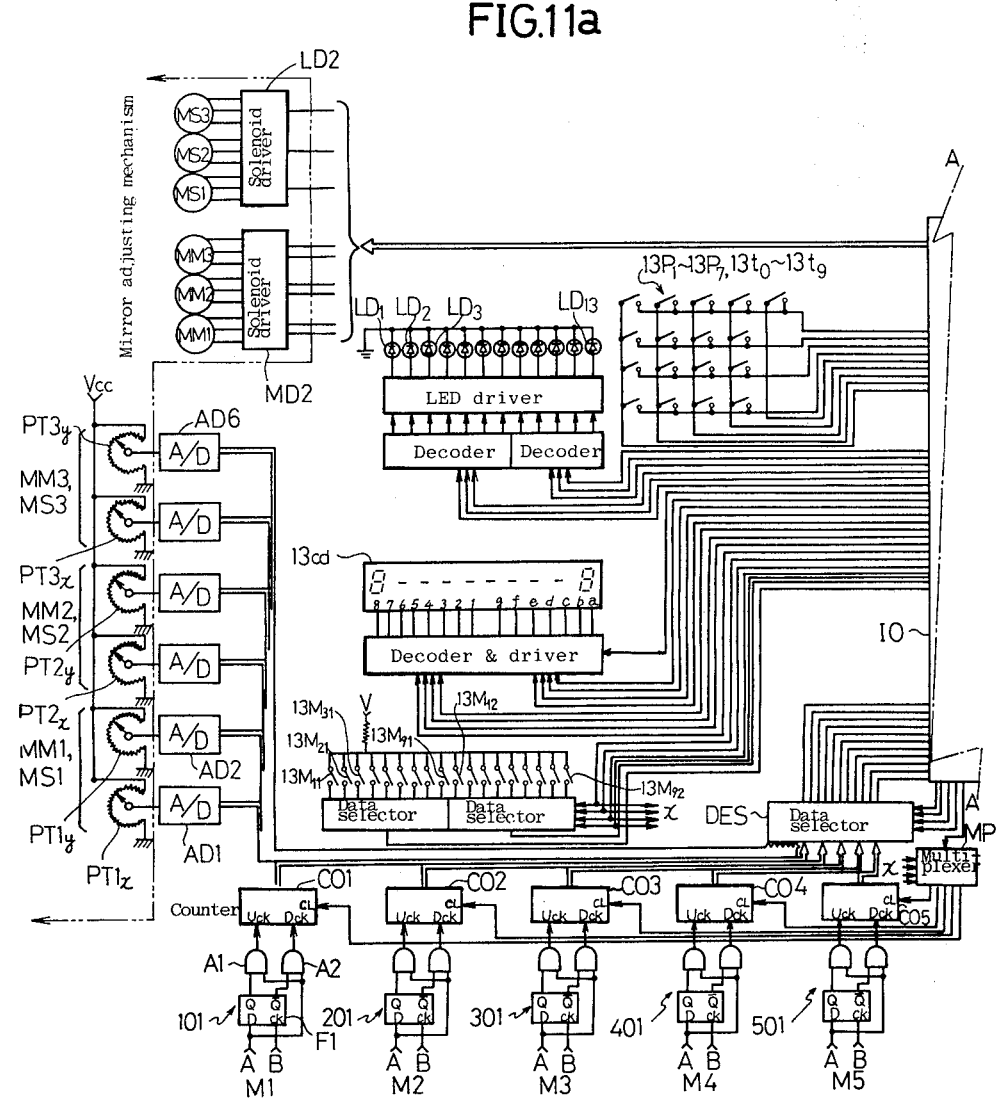
FIGS. 11a and 11b are block diagrams illustrating a combination of electrical components mounted on the keyboard shown in FIG. 10 and other electrical components mounted on the vehicle, these Figures being taken together by printing a phantom line A—A shown in FIG. 11a into superimposition with another phantom line B—B shown in FIG. 11b.
Figure 11B:
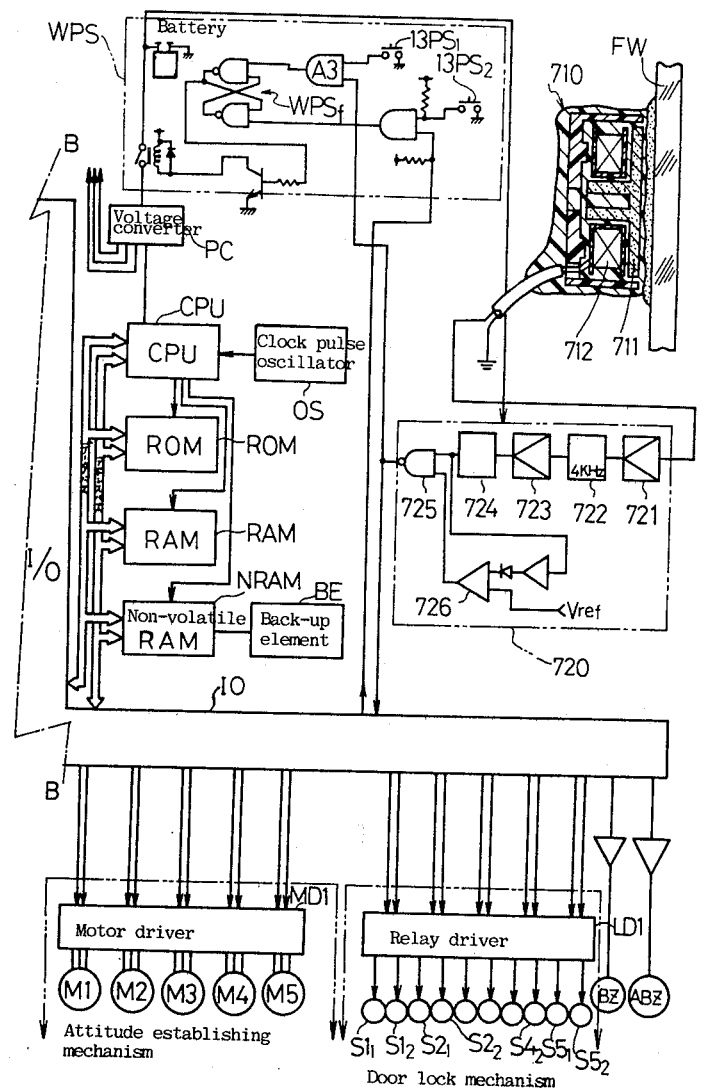

FIGS. 11a and 11b illustrate various combinations of electrical components mounted on the control panel. It is to be noted that both of these Figures are to be taken together by bringing a phantom line A—A shown in FIG. 11a into superimposition with another phantom line B—B shown in FIG. 11b. However, it should be noted that the power supply bus lines are omitted from illustration. It is to be noted in these Figures that the arrangement shown essentially comprises a microcomputer including a central processing unit CPU, a semiconductor read only memory ROM, a semiconductor read-write memory RAM, a non-volatile semiconductor read-write memory NRAM, a clock pulse oscillator OS, a battery backup unit BE, an input/output port I/O, a data bus and an address bus. Connected to the input/output port I/O are the switch terminals of the keys $13P_1$–$13P_7$ and ten keys $13t_0$–$13t_9$, decorders for energizing the light emitting diodes $LD_1$–$LD_{12}$, a circuit for energizing the character display 13cd, a multiplexer for reading the adjusting switches $S_{11}$–$S_{91}$, a data selector DES, a multiplexer MP, a relay driver, solenoid drivers $LD_1$, $LD_2$ and motor energizing circuits MD1, MD2. Input to the data selector DES are output codes from six A/D converters AD1-AD6 and count codes from five up-down counters CO1-CO5, with these counters being cleared by an output from the multiplexer MP. The count pulse input of each of the counters CO1-CO5 is connected to up-down discriminating circuits 101-501, respectively. The up-down discrminating circuit 101 comprises a D-type flipflop F1 which is set as its CK input changes from its low level or "0" to "1" when its D input assumes a high level or "1" and which is reset as the CK input changes from "0" to "1" when the D input is "0". In addition, the discriminating circuit 101 comprises an AND gate A1 which receives Q output from F1 and signal A and having its output applied to an up count input of the counter CO1, and another AND gate A2 which receives $\overline{Q}$ output from the flipflop F1 and the signal A and having its output applied to the down count input of the counter CO1. As the motor M1 rotates in the forward direction, the signal A is applied as a count pulse to the up count input of the counter CO1. When the motor M2 rotates in the reverse direction, the signal A is applied as a count pulse to the down count input of the counter CO1. In this manner, a count in the counter CO1 represents a forward movement of the seat from its home position. Other circuits 202-205 are constructed in completely the same as the circuit 101. In this manner, the counts in the counters CO2-CO5 represent the height of the front portion of the seat, the height of the rear portion of the seat, the inclination of the seat back and the strength or degree of cushioning of the seat back (or the position of lumber plate 12c).

Considering the A/D converters AD1-AD6, the converters AD1 and AD2 indicate the angle of rotation of the room mirror RM about the x-axis and about the y-axis, respectively, the converters AD3 and AD4 indicate the angle of rotation of the fender mirror $FM_R$ about the x-axis and about the y-axis, respectively, and the converters AD5 and AD6 indicate the angle of rotation of the fender mirror $FM_L$ about the x-axis and about the y-axis, respectively. The codes from these counters CO1-CO5 and the A/D converters AD1-AD6 are sequentially and selectively input to the microcomputer through the data selector DES.

The minimize the power dissipation when the vehicle is at rest, a standby power supply circuit WPS is provided, which is normally turned on together with the receiver 720 while the remainder is turned off. When the power switch $13PS_1$ is momentarily closed or an output from the receiver 720 which normally assumes a high level or "1" changes to its low level or "0", AND gate A3 produces "0" output, which in turn sets a flipflop $WPS_f$ to energize a power relay, thereby feeding a voltage converter PC. The voltage converter PC in turn feeds various parts. When the power switch $13PS_2$ is momentarily opened, the flipflop $WPS_f$ is reset to deenergize the power relay, whereby the input to the voltage converter PC is interrupted. The diode $LD_{13}$ (which is contained within 13LC shown in FIG. 10) is illuminated during the time the flipflop $WPS_f$ is set or the mircrocomputer is fed.

The ROM of the microcomputer contains program data which detects any key depressed by detecting the closure of any switch contact which occurs in response to the depression of one of the keys $13P_1$–$13P_7$ and $13t_0$–$13t_9$; program data which latches the illumination of light emitting diode or diodes corresponding to the key or keys depressed; display program data for indicating the key number on the display 13cd; manual response, attitude changing program data for energizing the motors M1–M5, MM1–MM3 and the solenoids MS1–MS3 in response to the detection of closure of the switches $13M_{11}$–$13M_{92}$; door lock control program data for energizing the relays $S1_1$–$S5_2$ in accordance with a code input; attitude establishing program data for energizing the motors M1–M5, MM1–MM3 and the solenoids MS1–MS3 in accordance with attitude data read from the non-volatile memory NRAM in response to a code input; program data for performing arithmetic operations and read- and write-operations of the non-volatile memory NRAM in response to key operations; and a variety of constants data. Of the primary importance among the constants data is attitude standard data. The operation of the microcomputer which is based on such data can be summarized as follows:

(a) Registration of a cipher word

When the key switches $13P_7$ and $13P_2$ are closed during the time the power switch $13PS_1$ is closed, "PAL P" is displayed on the most significant five digits of the display 13cd. Since it is assumed that five cipher words corresponding to keys No. 1–5 can be stored in the present embodiment, if one of keys $13_1$–$13_5$, for example, No. 2, is input subsequently, "PAL P2—" is displayed on the seven most significant digits of the display 13cd. If a cipher word is stored, for example, 90817 is stored in the No. 2 position, the word is added to the display at the five least significant digits, thus providing a total display of "PAL P2-90817". In the event a cipher word is not stored, "PAL P2-00000" is displayed. In any event, when an input from five of ten keys (five digits) is present under this condition, the first key input clears the display of the five least significant digits and causes the least significant digit to be replaced by the number of the input key. The digit display shifts to a next higher digit in response to each subsequent key input. For example, if the input is "13579", the final display will be "PAL P2-13579". When the SET key $13P_3$ is closed under this condition, a word "13579" (which comprises five codes) is stored in the second location within a cipher word storage region of the non-volatile memory NRAM. Upon completion of the registration, a buzzer BZ (see FIG. 11b) is energized for a given time interval, followed by deactivation of the display.

(b) Establishment of a standard driving attitude

When three digit numeral input, for example, 172, indicative of stature, is supplied by ten keys $13t_0$–$13t_9$ after the code key CODE $13P_1$ has been closed, "CO-172" is displayed, and attitude data containing numbers (170 and 175) which are close to the selected stature is read from the read only memory ROM, and standard data for the stature of 172 cm is calculated by interpolation. The driver's seat 10, the room mirror RM and the fender mirrors $FM_R$, $FM_L$ are set to an attitude which is represented by the standard data corresponding to the stature of 172 cm in response to the depression of SET key $13P_3$.

(c) Adjustment of attitude

When the switches $13M_{11}$–$13M_{51}$ are closed, the seat motors M1–M5 are energized for rotation in the forward direction during the time these switches remain closed. On the other hand, the seat motors M1–M5 are energized for rotation in the reverse direction in response to the closure of any one of the switches $13M_{12}$–$13M_{52}$. The mirror motors MM1–MM3 are energized for rotation in the forward direction in response to the closure of one of the switches $13M_{71}$–$13M_{91}$ while the mirror motors MM1–MM3 are energized for rotation in the reverse direction in response to the closure of one of the switches $13M_{72}$–$13M_{92}$. If the switch $13M_{62}$ is closed during the time when either one of the switches $13M_{71}$–$13M_{91}$ and $13M_{92}$–$13M_{92}$ is closed, the clutch coil MS1 is deenergized, causing the mirror to be driven either forwardly or reversely about the x-axis. If the switch $13M_{62}$ is closed, the clutch coil MS1 is energized, causing the mirror to be driven either forwardly or reversely about the y-axis. Accordingly, after the driver's seat 10 and the mirrors RM, $FM_R$, $FM_L$ have been set to the standard attitude, the switches $13M_{11}$–$13M_{92}$ can be utilized to adjust the attitude.

(d) Storage of attitude

When PROGRAM key $13P_2$ is closed, those storage locations within the memory where no cipher word is stored, for example, the location Nos. 1, 3, 4 and 5 are displayed in the form of "PR-1345". If all of these storage locations store cipher words, a display "PR-2345" is produced excluding the first storage location where a cipher word is already stored. Subsequently, when one of the ten keys $13t_1$–$13t_5$, for example, $13t_3$ corresponding to "3", is closed, the counts in the counters CO1—CO5 and the output codes from the A/D converters AD1–AD6 are stored in the storage region No. 3 of the non-volatile memory NRAM except for an area where the cipher word is stored.

(e) Storage of leaving attitude

The seat and the mirrors are adjusted to the attitude which is assumed when leaving the vehicle, and PROGRAM key $13P_2$ is depressed and one of the ten keys is utilized to specify one of 1–5, for example, 3, followed by the depression of an alighting key $13P_5$. The subsequent depression of SET key $13P_3$ enable the codes in the counters CO1–CO5 and the output codes of the A/D converters AD1–AD6 to be stored in storage location No. 3 of the non-volatile memory NRAM in an area which is adjacent to the area where driving attitude data is stored.

(f) Door unlock

The signal emitter 600 (see FIGS. 8a and 8b) is brought close to the receiving terminal 710 (see FIGS. 6 and 11) and one of the key switches 1-6 to 5-0 and the LOC is closed, whereupon a code indicative of the key is transmitted from the coil 630 and intercepted by the receiver 720. AND gate 725 changes its output to a low level or "0" temporarily, whereby the flipflop $WPS_f$ of the backup battery circuit WPS (see FIG. 11b) is set, energizing the power relay, thus allowing the voltage converter PC to feed the microcomputer and its associated electrical circuit. When a cipher word is transmitted from the emitter 600 through a selective closure of the switches 1-6 to 5-0, the microcomputer checks if the cipher word coincides with one of the cipher words stored in the storage regions No. 1 to No. 5 of the non-volatile memory NRAM. When it finds coincidence, it waits for a next coming key code. If a code indicative of the key No. 1 (1-6) is applied, the door of the driver's seat is unlocked. If a code is applied which indicates the key No. 2 (2-7), the door associated with an assistant driver is unlocked. A code indicative of the key No. 3 (3-8) causes the door located behind the assistant driver's seat to be unlocked while the door located behind the driver's seat is unlocked in response to a code indicative of the key No. 4 (4-9). Finally, a tonneau cover is unlocked in response to a code indicative of the key No. 5 (5-0).

(g) Automatic establishment of attitude

When the door associated with the driver's seat is unlocked in response to an oncoming cipher word, the microcomputer then operates to read out the driving attitude data from the non-volatile memory NRAM at the storage location where the cipher word is stored. It then automatically establishes the attitude of the driver's seat and mirrors in accordance with such data. Similarly, when one of the ten keys $13t_1$–$13t_5$ on the keyboard 13 is closed after SEAT key $13P_6$ has been turned on, the driving attitude data stored in the non-volatile memory NRAM at the storage location number indicated by one of the ten keys is read out, and the attitude of the driver's seat and the mirrors is automatically established in accordance with such data.

(h) Automatic establishment of leaving attitude

When one of the ten keys $13t_1$–$13t_5$ is closed after the alighting key $13P_5$ has been turned on, the leaving attitude data stored in the non-volatile memory NRAM at the storage location number indicated by such key is read out, and the attitude of the driver's seat and the mirrors is automatically established in accordance with such data.

(i) Automatic door lock

The signal emitter 600 is brought close to the receiving terminal 710, and LOC key closed. In response to the application of a code indicative of the LOC key, the microcomputer operates to lock every door, followed by resetting the flipflop $WPS_f$ of the standby power supply circuit WPS.

(j) Display of registered cipher word

When PAL key $13P_7$ is turned on together with CODE key $13P_1$, followed by an input of a code indicative of the storage location number from one of the ten keys $13t_0$–$13t_9$, the cipher word (five digits) stored at such storage location is displayed on the display 13cd.

FIGS. 12a to 12g indicate flow charts illustrating the operation of the microcomputer. In these flow charts, the storage locations of the read only memory ROM where constants data is stored is referred to as memory 1, memory 2 . . . while storage locations within the non-volatile memory NRAM are referred to as non-volatile memory 1, 2 . . . . Storage locations within the random access memory are referred to as registers. Principal memories store contents as indicated in the Table below.

TABLE 1

| Memories in ROM | |
|---|---|
| storage regions | stored content |
| memory 1 | attitude data (in 11 codes) for stature of 140 cm |
| memory 2 | attitude date (in 11 codes) for stature of 145 cm |
| memory 3 | attitude date (in 11 codes) for stature of 150 cm |
| . | |
| . | |
| . | |
| memory 12 | attitude data (in 11 codes) for stature of 195 cm |
| memory 13 | attitude data (in 11 codes) for alighting |

TABLE 2

| | Memories in NRAM | |
|---|---|---|
| No. | storage regions | stored content |
| 1 | 1-1 | cipher word (five digits) |
| | 1-2 | driving attitude data (11 codes inclusive of seat and mirrors) |
| | 1-3 | leaving attitude data (11 codes) *cipher word memory 1 |
| 2 | 2-1 | cipher word (five digits) |
| | 2-2 | driving attitude data (11 codes inclusive of seat and mirrors) |
| | 2-3 | leaving attitude data (11 codes) *cipher word memory 2 |
| 3 | 3-1 | cipher word (five digits) |
| | 3-2 | driving attitude data (11 codes inclusive of seat and mirrors) |
| | 3-3 | leaving attitude data (11 codes) *cipher word memory 3 |
| 4 | 4-1 | cipher word (five digits) |
| | 4-2 | driving attitude data (11 codes inclusive of seat and mirrors) |
| | 4-3 | leaving attitude data (11 codes) *cipher word memory 4 |
| 5 | 5-1 | cipher word (five digits) |
| | 5-2 | driving attitude data (11 codes inclusive of seat and mirrors) |
| | 5-3 | leaving attitude data (11 codes) *cipher word memory 5 |
| 6 | | current attitude data |
| 7 | | number of key inputs |

TABLE 3

| RAM | |
|---|---|
| storage regions | stored content |
| register 1 | first digit of data displayed on display 13cd |
| register 2 | second digit of data displayed on display 13cd |
| . | . |
| . | . |
| . | . |
| register 8 | eighth digit of data displayed on display 13cd |
| register 9 (attitude register) | attitude data (11 codes) read from NRAM & ROM |
| register 10 | temporary data |
| . | . |
| . | . |
| . | . |
| register 20 | oncoming code from emitter 600 or input from keyboard 13 |
| register 21, 22, 23, 24, 25 | each oncoming code stored |

TABLE 3-continued

| RAM | |
|---|---|
| storage regious | stored content |
| register 26 | time count |

Referring to FIGS. 12a to 12g, a manipulation by the driver and a corresponding operation performed by the microcomputer will now be described. Initially the power switch 13PS is turned on to feed the microcomputer. In response thereto, the microcomputer turns on the power supplies associated with the various parts of the circuit in a given sequence, and clears memories contained in the internal RAM and the external RAM of the unit CPU. Also latches in the I/O port are cleared (initialization). It then waits for a key input from the keyboard or a code transmitted from the signal emitter 600.

Figure 12A:
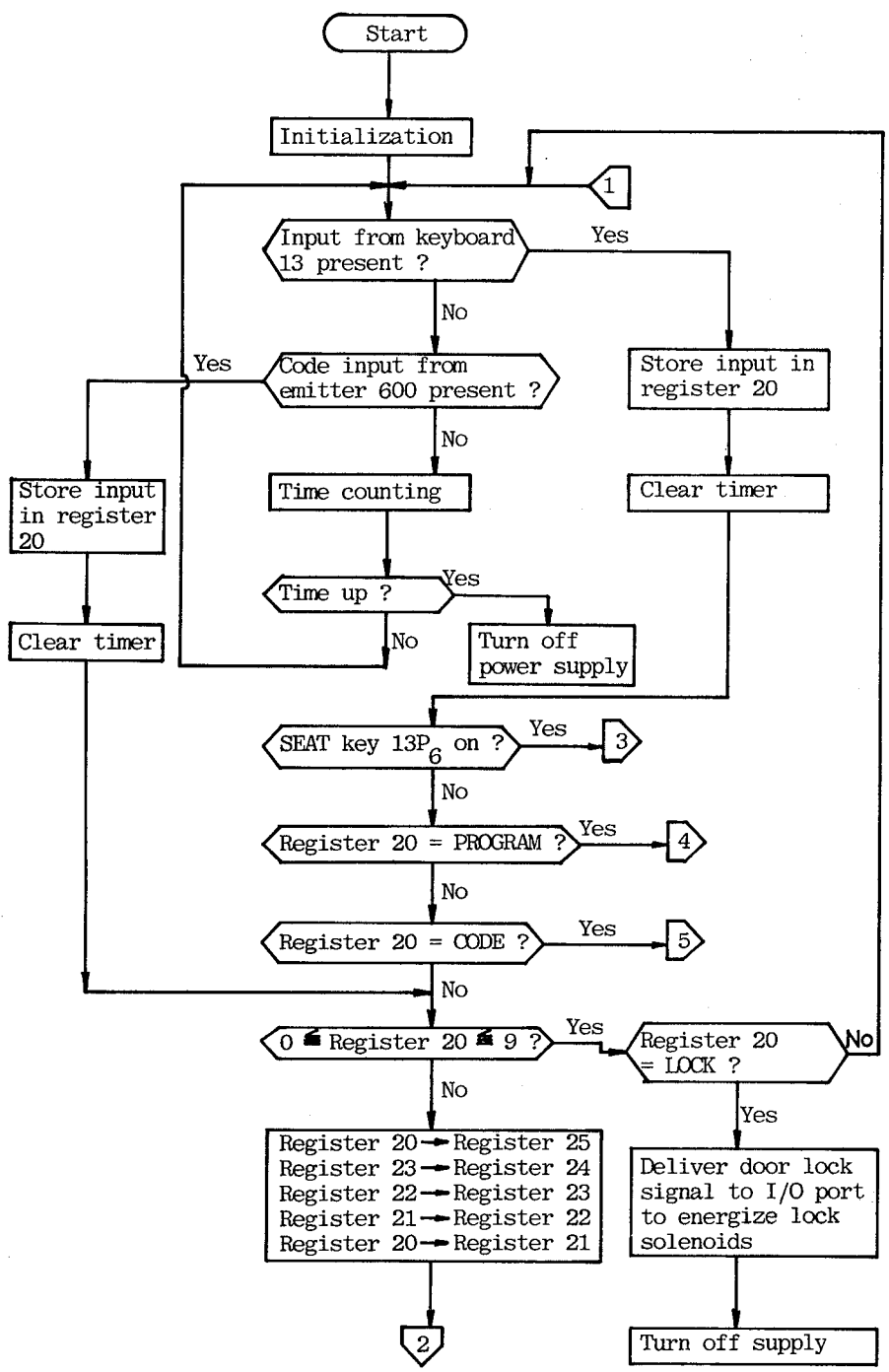

Initially considering the flow chart shown in FIG. 12a, a time counting is started together with a key input standby mode, and after a given time interval, the standby power supply circuit WPS is reset, thus interrupting the circuit WPS and other power supplies associated with circuits other than the receiver 720. However, if there is a key input from the keyboard 13 during such time interval or a code is inputted from the receiver 720, it is stored in the register 20 while clearing the time count register or timer.

An operation which occurs in response to a key input from the keyboard 13 includes the storage of a cipher word, the establishment and storage of a driving attitude, and the establishment and storage of a leaving attitude. On the other hand, an operation which occurs in response to a code input from the receiver 720 includes a door unlock operation, the establishment of a driving attitude and a door lock operation.

Figure 12B:
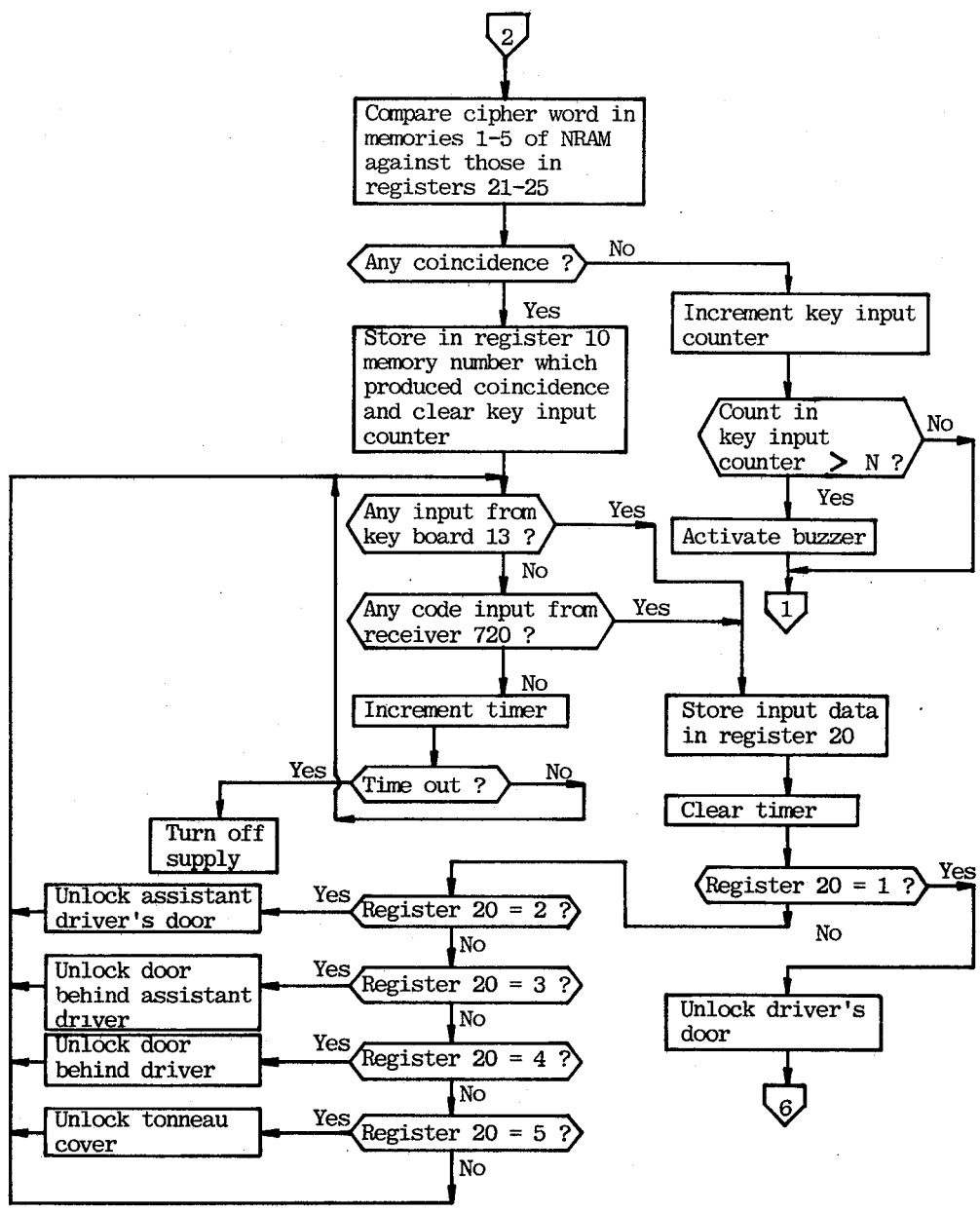
Figure 12C:
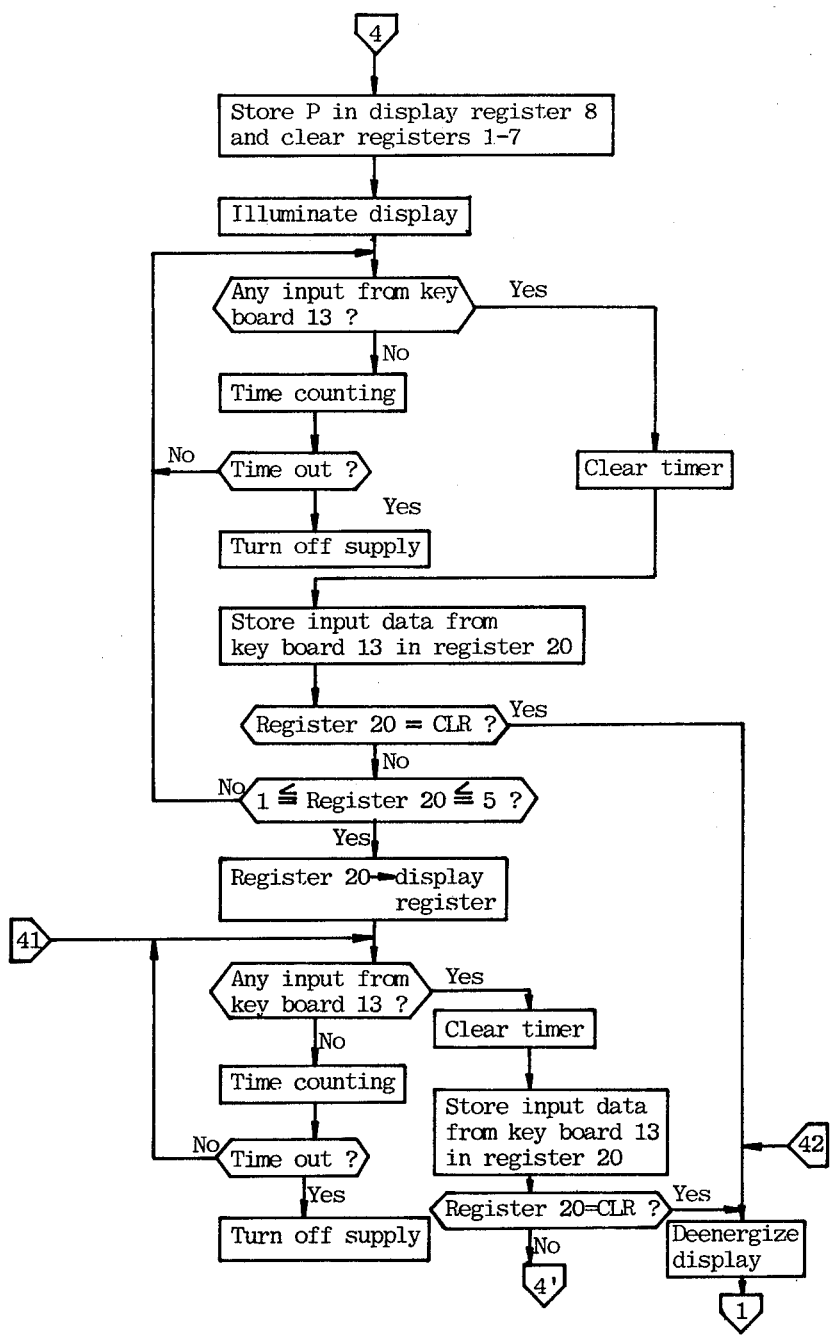
Figure 12D:
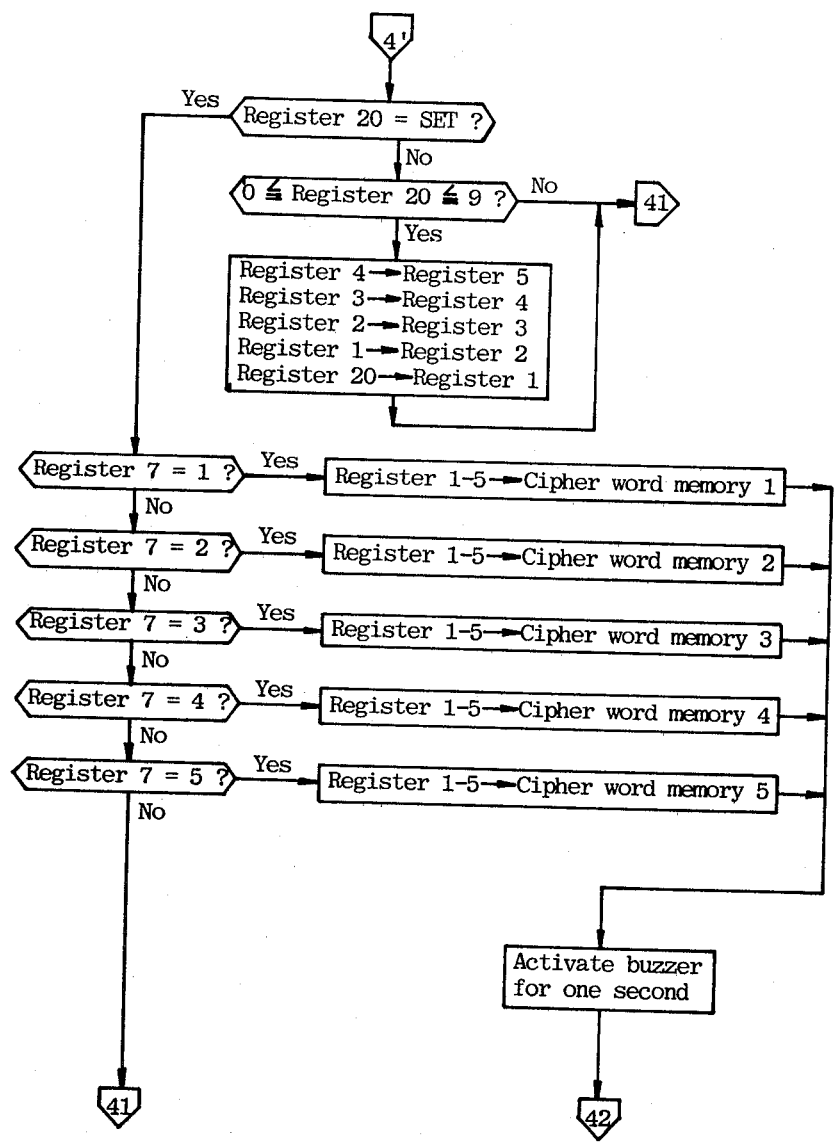
Figure 12E:
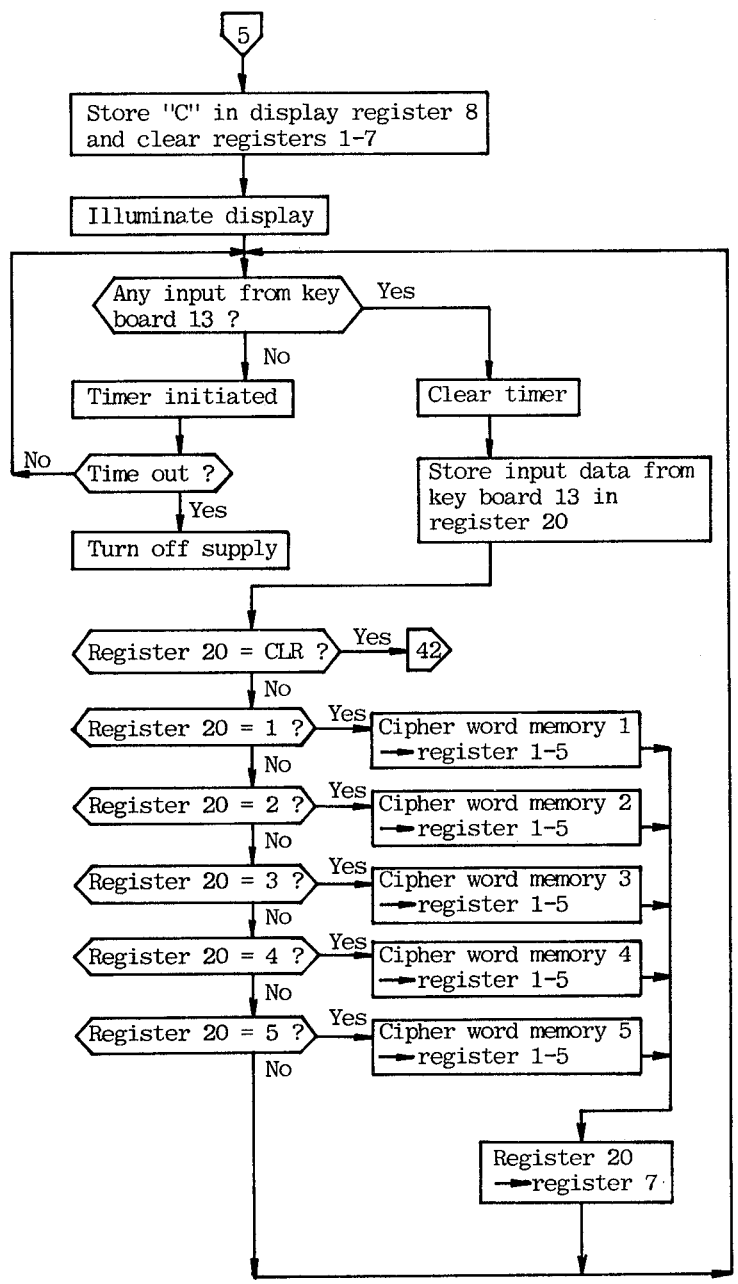
Figure 12F:
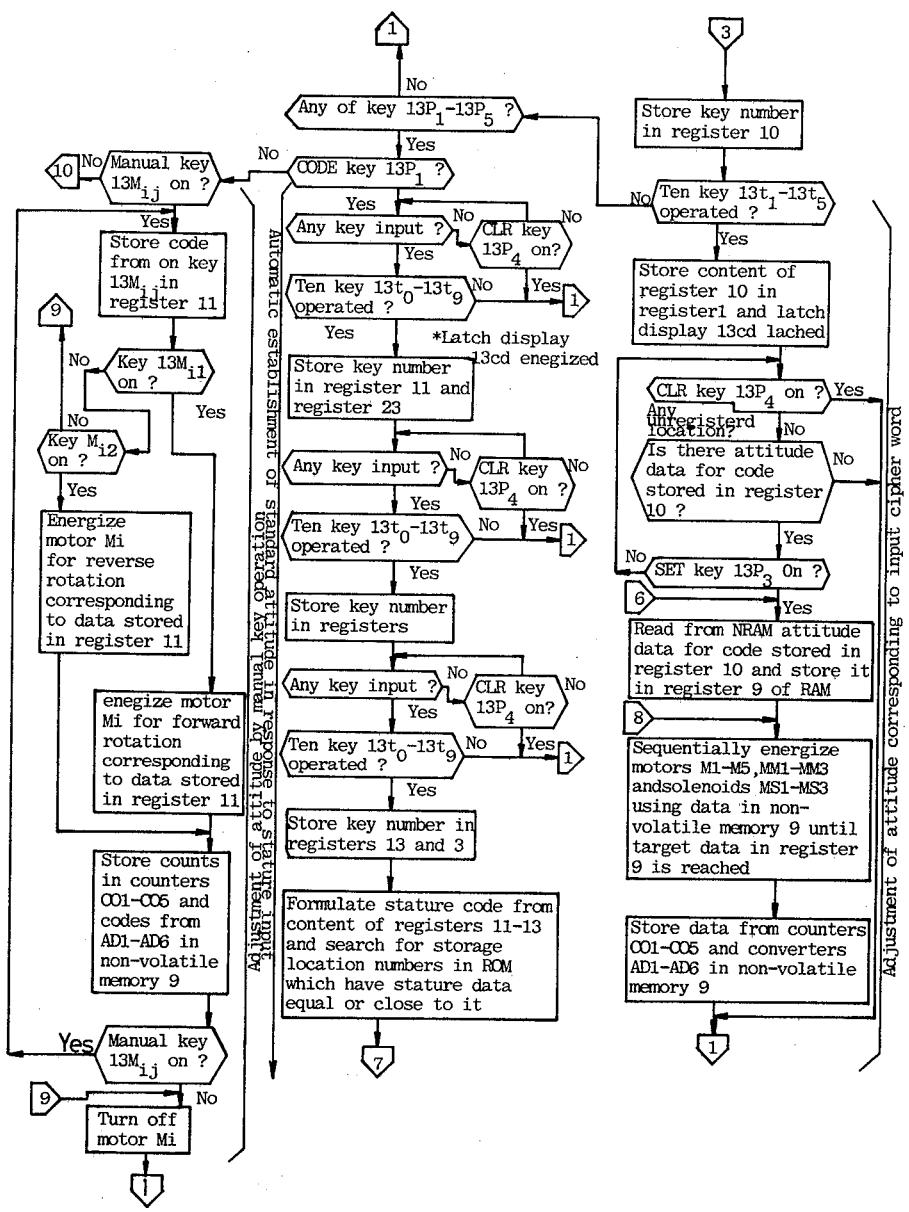
Figure 129:
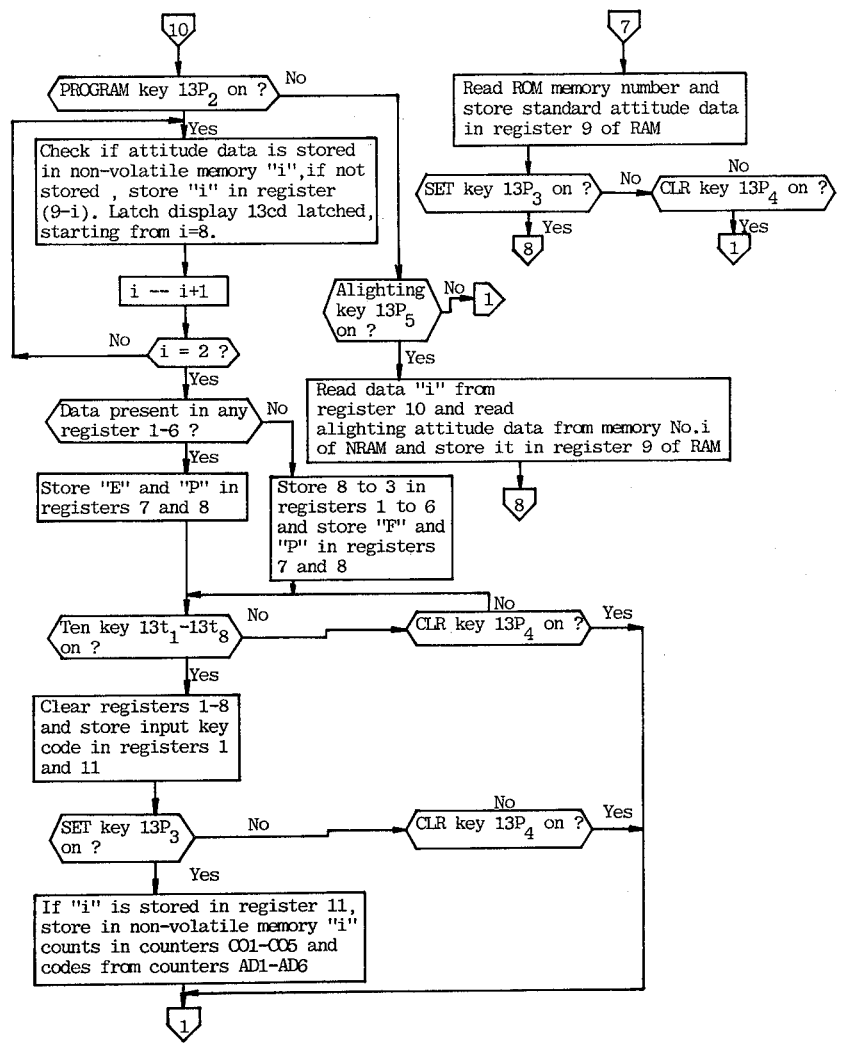

Assuming first that there is a key input from the keyboard 13, the first of which represents the turning on of SEAT key 13P$_6$, the operation proceeds to the flow charts shown in FIGS. 12f and 12g where the driving and the leaving attitude are established, adjusted and stored in the non-volatile memory NRAM. If the initial key operated is PROGRAM key 13P$_2$, the operation proceeds to the flow charts shown in FIGS. 12c and 12d where the cipher word is stored. If the initial key operated is CODE key 13P$_1$, the operation proceeds to the display of the cipher word as indicated in the flow chart of FIG. 12e.

If on the other hand there is a code input from the receiver 720, the operation proceeds to the door lock and the door unlock operation indicated in the flow charts shown in the later part of FIG. 12a and FIG. 12b.

Assuming that there is a code input from the receiver 720 (later part of FIG. 12a) which represents the LOC key (see FIG. 8a), the lock relays associated with all of the doors are energized to lock them, followed by resetting the standby power supply circuit WPS (see FIG. 11). If the input code represents a key other than LOC key, oncoming codes are sequentially stored in the registers 21 to 25, and an input word comprising a combination of five codes stored in the registers 21 to 25 is compared against the cipher words stored in the storage locations No. 1 to No. 5 of the non-volatile memory NRAM (FIG. 12b). If it coincides with one of the latter words, the number of the storage location where it is stored is stored in a register 10 while clearing a storage location No. 7 of the non-volatile memory NRAM. In the event of failure of finding a coincidence, 1 is added to the content of the storage location No. 7 of the non-volatile memory NRAM. When the content stored at the storage location No. 7 exceeds a given value N, an alarm buzzer ABZ (FIG. 11b) is energized. However, if the input word coincides with one of the cipher words, and the storage location number where it is stored is stored in the register 10, the microcomputer waits for the application of a door specifying code from the emitter 600 or waits for another key operation of the keyboard 13 while initiating a time counting. If there is no code input during a given time interval, the standby power supply circuit WPS is reset. If a code indicative of a numeral 1 is received from the receiver 720, the door associated with a driver's seat is unlocked. If a code indicative of one of the numerals 2 to 5 appears additionally or alternatively, a corresponding door such as the door associated with an assistant driver is unlocked. When the door associated with the driver's seat and a numeral code corresponding to 2 to 5 is supplied from the keyboard 13, a corresponding door is unlocked, thus permitting other doors to be unlocked through a key operation of the keyboard 13 within the vehicle in the same manner as it occurs in response to a code input from the receiver 720. The operation proceeds to the establishment of attitude shown in FIG. 12f when the door associated with a driver's seat is unlocked. The above covers the description of the flow chart relating to the door lock and the door unlock operation.

Referring to FIGS. 12c and 12d for describing the situation when PROGRAM key 13P$_2$ is turned on, the character "P" is displayed on the character display 13cd while initiating a time counting operation. When a given time interval has passed, the standby power supply circuit WPS is reset. However, if there is a ten key input during such time interval, it is stored in the register 20, and the numeral stored in the register 20 (representing the storage location number of the non-volatile memory NRAM) is displayed on the display 13cd. Each time numeral 0-9 is supplied by a subsequent ten key input, it is stored and the numeral is displayed on the least significant digit position while shifting the previously displayed digit to a next higher digit position. When SET key 13P$_3$ is depressed after a five digit input comprising a cipher word formed by five codes has been received (FIG. 12d), the cipher word is stored in an input storage location number.

When CODE key 13P$_1$ is turned on (FIG. 12e), the character "C" is displayed on the display 13cd, and any input 13t$_i$ from the ten keys 13t$_1$ to 13t$_5$ causes the cipher word stored at the storage location No. i of the non-volatile memory NRAM to be displayed on the display 13cd.

Referring to FIGS. 12f and 12g, if SEAT key 13P$_6$ is turned on and one of the ten keys 13t$_1$-13t$_5$, (which is represented as 13t$_i$) is turned on, the value "i" is stored in the register 10 and displayed on the display 13cd. The attitude data stored in the non-volatile memory NRAM at the storage location No. i is read out. When SET key 13P$_3$ is turned on, the motors M1-M5 associated with the driver's seat, the motors MM1-MM3 associated with the mirrors and the solenoids MS1-MS3 are sequentially energized to establish the attitude of the seat and the mirrors in accordance with the data read out from the non-volatile memory. If the driver depresses CODE key 13P$_1$ rather than operating the ten keys 13t$_1$-13t$_5$, the microcomputer latches the light emitting diode associated with the particular key illuminated, and stores the closure of the key switch $13P_1$. The latched condition of illumination and the storage of the closure of the key switch $13P_1$ are retained until another one of the keys $13P_2$–$13P_5$ is turned on. The microcomputer then waits for an input from the ten keys $13t_0$–$13t_9$, and when a three digit input representing the stature expressed in unit of cm is supplied, it is displayed on the display $13cd$ in the sequence the digits are supplied. Assuming that an input of "167" is supplied, the attitude data stored in memory 6 of the memory ROM (five codes representing the standard attitude corresponding to the stature of 165 cm) is stored in a register 14 while data stored in memory 7 of the memory ROM (five codes representing the standard attitude for the stature of 170 cm) is stored in a register 15. For each corresponding code, standard attitude code is calculated by interpolation for the stature of 167 cm, and is stored in a register 9. When the driver turns SET key $13P_3$ on, the storage of the turn-on of the key $13P_1$ is cleared, and the latched illumination of the associated light emitting diode is terminated. Instead, the turn-on of the key $13P_3$ is stored and its associated light emitting diode latched illuminated. The mechanisms 100 to 500 which are utilized to establish the attitude of the driver's seat as well as the rotating mechanisms associated with the mirrors RM, $FM_R$, $FM_L$ are sequentially energized and controlled. During such control, if it is assumed that data contained in a non-volatile memory 9 of NRAM which indicates the current position of the mechanism 100 is equal to "120" while the target data for the mechanism 100 which is stored in the register 9 is equal to "150", a positive difference $150-120=30$ causes the motor M1 to be energized for rotation in the forward direction until the count in the counter CO1 becomes equal to "150", whereupon the forward rotation of the motor M1 is terminated. If it is assumed that data in the non-volatile memory 9 is equal to "200" while the data in the register 9 is equal to "100", a negative difference of $100-200=-100$ causes the motor M1 to be energized for rotation in the reverse direction until the count in the counter CO1 becomes equal to "100", whereupon the reverse rotation of the motor M1 is terminated. If a limit switch LSm1 is turned on during the forward rotation, the latter rotation is terminated and inhibited during the time the limit switch remains on. Conversely, when a limit switch LSh1 is turned on, the reverse rotation is terminated and is inhibited during the time this limit switch remains on, and the counter CO1 is cleared at the time the limit switch is turned on. Such claculation and control of the energization of the motors take place sequentially with respect to the motors M1 to M5 and MM1 to MM3 and the solenoids MS1 to MS3. When such control is completed, all the registers are cleared or initialized and return to a key input standby mode. In this manner, by supplying stature information and depressing SET key, the seat 10 is automatically established to its standard attitude corresponding to the stature.

Secondly, considering a manual adjustment shown in the left-hand one-third of FIG. 12f, when either switch $M_{11}$–$M_{92}$ is closed, the motors M1–M5 and MM1–MM3 are energized for forward rotation in response to the actuation of the switches $M_{11}$–$M_{51}$ and $M_{71}$–$M_{91}$ while they are energized for reverse rotation in response to the actuation of the switches $M_{12}$–$M_{52}$ and $M_{72}$–$M_{92}$. When the switch $M_{61}$ is turned on, the solenoids MS1–MS3 are deenergized while they are energized when the switch $M_{62}$ is turned. Accordingly, the closure of the switches $M_{11}$–$M_{92}$ permits the various parts of the seat and the various mirrors to be adjusted in their attitude in an arbitrary manner.

Thirdly, considering the registration of attitude data corresponding to an identification code No. 1 to No. 5, the depression of PROGRAM key $13P_2$ by the driver causes the microcomputer to terminate the storage of the turn-on of other keys $13P_1$ and $13P_3$–$13P_5$ as well as the latched illumination of the associated light emitting diode while storing the turn-on of the key $13P_1$ and latching the illumination of its associated light emitting diode. The microcomputer then checks if there is attitude data in non-volatile memories No. 2–No. 5, and displays the number of memories having no attitude data therein on the first to the fourth digit of the display $13cd$. If attitude data is absent in one of non-volatile memories No. 2–No. 5, the characters "E" and "P" are displayed on the seventh and the eighth digit, respectively. When each of the non-volatile memories No. 2–No. 5 contain attitude data, numerals 5 to 2 are sequentially displayed on the first to the fourth digit while the characters "F" and "P" are displayed on the seventh and the eighth digit, respectively. The microcomputer then waits for one of ten keys $13t_1$–$13t_5$ to be turned on, and when one of them is turned on, the display is cleared while displaying the number of the input key. Representing the number of input key by i, the counts in the counters CO1–CO5 and the output codes from the A/D converters AD1–AD6 are stored as attitude data in the non-volatile memory No. i.

When the alighting key $13P_5$ is turned on, alighting attitude data is read from a memory No. i of the non-volatile memory NRAM where i represents a number stored in the register 10. The seat and the mirrors are established to an attitude indicated by such data. It should be noted that the alighting attitude data is stored in the memories No. 1–No. 5 of NRAM in the same manner as the driving attitude data is stored, but that the alighting key $13P_5$ must be turned on before PROGRAM key $13P_2$ and SET key $13P_3$ are turned on.

In the embodiment described above, five regions No. 1–No. 5 are assigned in the non-volatile memory NRAM to permit the storage of five sets of cipher words, driving attitude data and leaving attitude data. When one of the cipher words is transmitted from the emitter 600 followed by a code indicative of the number of the particular door to be unlocked when the vehicle is at rest and while the door remains closed, the particular door is unlocked and the attitude of the driver's seat and the mirrors are automatically established in accordance with attitude data which corresponds to the input cipher word. When one of the memories No. 1 to No. 5 receives an input in response to a key operation of the keyboard 13 within the vehicle, a corresponding attitude data is read from the non-volatile memory NRAM to provide an automatic establishment of the attitude of the driver's seat and the mirrors. Thus, the cipher word comprises an unlock code while the storage locations No. 1 to No. 5 of the non-volatile memory NRAM provides a manual code. However, once a cipher word is registered, a one-to-one correspondence is established between the number of the storage location of the non-volatile memory NRAM, the cipher word and the attitude data, so that the unlock code may comprise the number of the storage location within the non-volatile memory NRAM which represents a manual code, or conversely, the manual code may comprise an unlock code or a cipher word formed by a combination of unlock codes.

In the embodiment described above, an arrangement is made such that as soon as the door associated with the driver's seat is unlocked, the attitude of the driver's seat and the mirrors is automatically established in response thereto. However, the automatic establishment of the attitude can be conditioned upon a key operation of the keyboard 13.

From the foregoing description, it will be appreciated that in accordance with the invention, a door may be locked or unlocked in response to a switch operation on the part of the portable signal emitter. In the preferred embodiment, the driver's seat and the mirrors are automatically established to an attitude which has been previously selected by a user in response to the door unlock. Thus, the invention eliminates the need for a mechanical key operation to lock or unlock the door, thus simplifying a door opening or closing operation. Because the door unlock operation is controlled by an electronic code, the risk of a theft by the use of a duplicate key is reduced.

What we claim is:

1. A system for controlling a door and driver's seat of a vehicle comprising:
    a portable code emitter including a plurality of switches and a code generator for producing a code indicative of a particular switch operated;
    a receiver mounted on a vehicle for receiving said code;
    a plurality of key switches mounted on said vehicle for indicating and instructing a code, a registration command and an attitude information store command;
    an automatic seat adjusting mechanism mounted on said vehicle and including at least one electric motor;
    driver means for energizing each of said motors of said seat adjusting mechanism;
    an attitude information generator connected to said seat adjusting mechanism for producing a signal indicative of the attitude of a seat;
    a door lock controlling device mounted on said vehicle; and
    an electronic control unit connected to said receiver, said plurality of key switches said driver means, said attitude information generator and said door lock controlling device;
    said electronic control unit comprising electronic processor means and memory means including a read only memory, a read-write memory and a non-volatile, read-write memory;
    said electronic control unit storing said code indicated with said key switches as a door unlocking code at a predetermined address of the non-volatile, read-write memory in response to a registration command entered with said key switches;
    said electronic control unit storing the attitude information produced by said attitude information generator at an address of the non-volatile, read-write memory in response to an attitude information store command entered with said key switches, the address corresponding to said door unlocking code stored in the non-volatile, read-write memory; and
    said electronic control unit energizing said door lock controlling device for an unlocking operation when the portable code emitter produces a code which coincides with said door unlocking code stored in the non-volatile, read-write memory, reading out the attitude information at the address corresponding to said door unlocking code and energizing the driving means for establishing the attitude of the seat as indicated by the read attitude information.

2. A system according to claim 1 wherein said electronic control unit energizes said door lock controlling device for a locking operation when said code emitter produces a code indicative of the closure of at least one of said switches of said code emitter.

3. A system according to claim 1 wherein said code emitter is a radio transmitter including a modulator which modulates a carrier signal in accordance with a code generated by said code generator and a transmitting coil for transmitting the modulated carrier signal and wherein said receiver is a radio receiver including a receiving coil and a demodulator which demodulates a code signal from the received carrier signal.

4. A system according to claim 1 further comprising a plurality of adjustment key switches connected to said electronic control unit for instructing an adjustment of the seat attitude by the automatic seat adjusting mechanism whereby the electronic control unit energizes the automatic seat adjusting mechanism in a direction corresponding to the operation of said adjustment key switches.

5. A system according to claim 1 further comprising:
    an automatic mirror adjusting mechanism mounted on said vehicle;
    an attitude information generator connected to said mirror adjusting mechanism for producing a signal indicative of the attitude of said mirror; and
    a plurality of adjustment key switches connected to said electronic control unit for instructing said automatic mirror adjusting mechanism to adjust the attitude of said mirror;
    said electronic control unit storing and reading out the attitude information produced by the mirror attitude information generator at an address corresponding to said door unlocking code whereby said electronic control unit subsequently energizes said automatic mirror adjusting mechanism.

* * * * *